United States Patent [19]

Urso

[11] Patent Number: 4,845,879
[45] Date of Patent: Jul. 11, 1989

[54] ANTIFRICTION CASTING ROD

[76] Inventor: Charles L. Urso, 215 Newton St., Waltham, Mass. 02154

[21] Appl. No.: 118,432

[22] Filed: Nov. 6, 1987

[51] Int. Cl.[4] ...................... A01K 87/00; A01K 91/02
[52] U.S. Cl. ......................................... 43/18.1; 43/19; 43/44.98; 294/66.1
[58] Field of Search ...................... 43/18.1, 18.5, 44.98, 43/22, 23, 19; 124/86; 294/19.1, 66.1, 126, 127

[56] References Cited

U.S. PATENT DOCUMENTS

| | | | |
|---|---|---|---|
| 1,124,726 | 1/1915 | Gray | 43/6 |
| 1,846,912 | 2/1932 | Sedgley | 43/44.98 |
| 1,982,304 | 11/1934 | Holden | 43/44.98 |
| 3,015,182 | 1/1962 | Tuttle | 43/6 |
| 3,296,732 | 1/1967 | Magnus | 43/23 |
| 3,416,256 | 12/1968 | Blocker | 43/19 |
| 3,685,195 | 8/1972 | Merryweather | 43/18.1 |
| 4,031,840 | 6/1977 | Boisrayon | 43/6 |
| 4,336,087 | 6/1982 | Martuch | 43/44.98 |
| 4,651,461 | 3/1987 | Williams | 43/23 |
| 4,702,507 | 10/1987 | Medendorp | 294/66.1 |

OTHER PUBLICATIONS

Bass Pro Shops Christmas 1987 Catalog, p. 57, Ice 'N Easy Rod.

*Primary Examiner*—Gene P. Crosby
*Attorney, Agent, or Firm*—Hamilton, Brook, Smith & Reynolds

[57] ABSTRACT

A casting rod combined with an open face reel such that during a cast swing, a main portion of the rod moves in front of the reel to avoid colliding with casting line peeling off at the reel spool. The line is guided by a rod tip guide positioned at a tip portion of the rod. The combination is arranged such that nothing other than the mentioned guide contacts the line during the cast, thereby producing very little friction. During line retrieval, a retrieval guide positioned between the reel and the rod tip guide, guides the line onto the grooved rim of a roller as the rod bends under load. Several embodiments of the invention include various mechanisms for releasing the line during the cast swing. The rod can cast heavy lines without backlash and has applications that are not limited to fishing.

20 Claims, 8 Drawing Sheets

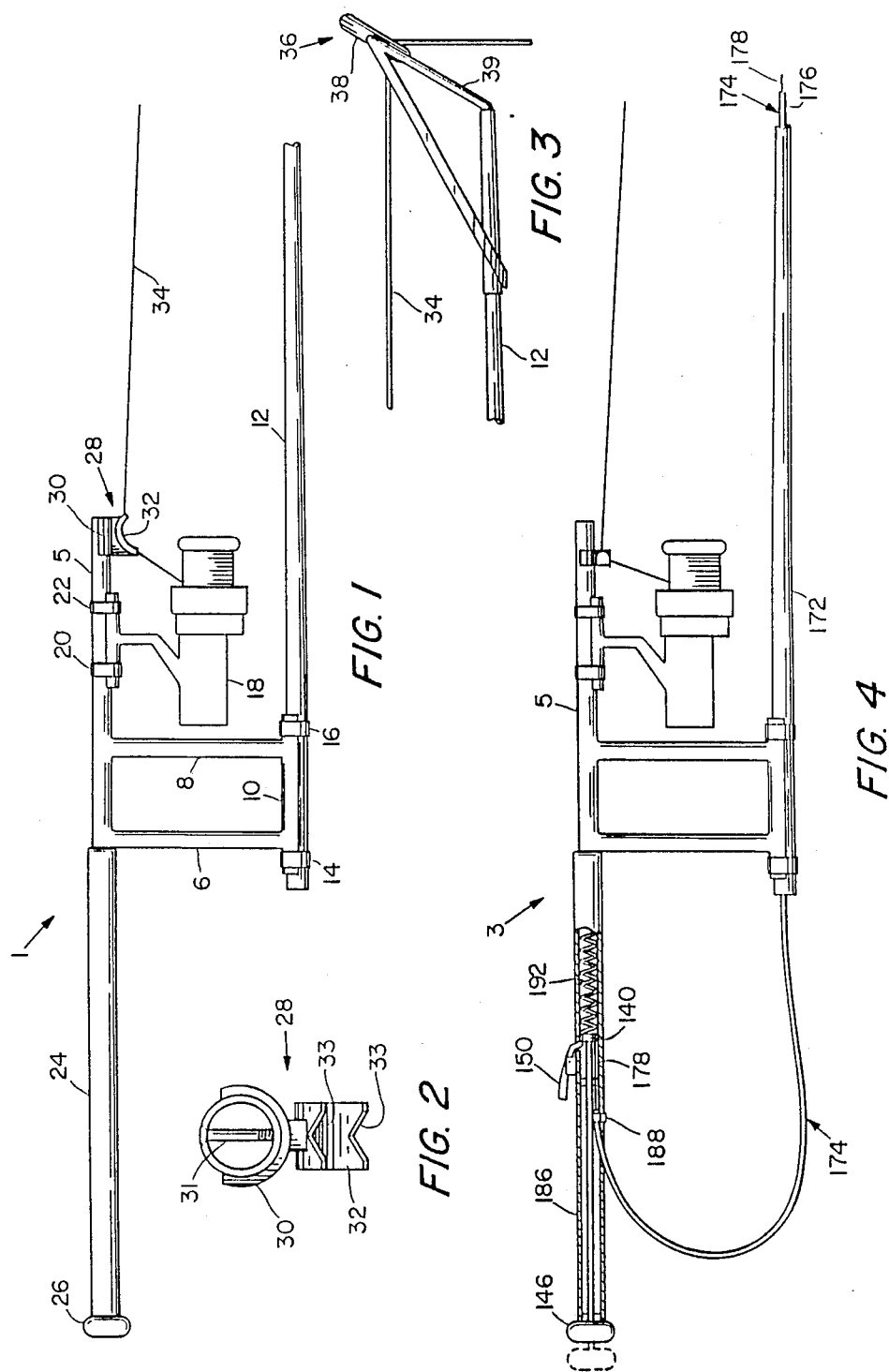

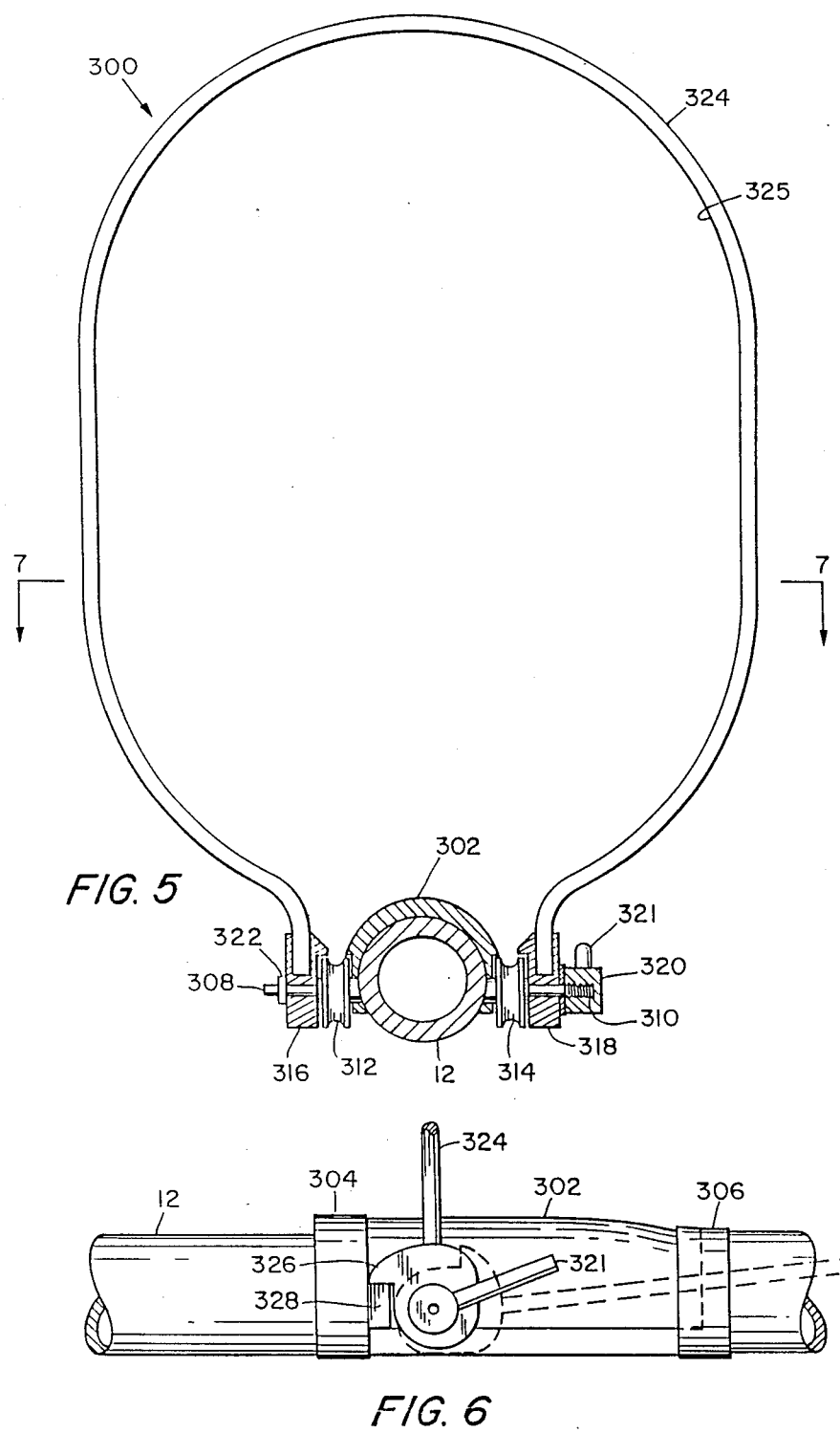

ANTIFRICTION CASTING ROD

FIELD OF THE INVENTION

This invention relates to casting rods, especially casting rods utilized with open face reels.

BACKGROUND OF THE INVENTION

When casting with an open face reel, such as with a spinning reel mounted on a conventional spinning rod, the casting line peels off of the reel spool in the form of spirals. As the relatively large spirals are forced through the guides on the rod, friction is produced and energy is wasted at each of the guides. Consequently, the line is slowed and the cast distance is reduced. The problem is greatly increased when stronger (heavier) lines are used.

The severest friction occurs at the guides that are closest to the reel. However, merely eliminating those guides in a conventional rod does not solve the problem. Without those guides a conventional spinning rod would collide with the line spirals, during the cast swing, resulting in fouled line and a failed cast.

Therefore, commonly used spinning rods are limited to using very thin lines, wherein line strength is sacrificed.

Heavier lines can be used in some bait casting systems. In these systems, however, energy is consumed during the cast to overcome the initial spool inertia in order to produce the necessary high speed spool rotations. Still more of the cast energy is lost to the various means of reducing backlash. These energy losses in concert with friction produced at the guides, slow the line speed and shorten the length of the cast.

The present invention is a substantially improved casting system. It provides a means of casting very high strength lines, including braided lines, over relatively long distances without backlash. In addition to fishing, the device can be employed in several other important applications.

SUMMARY OF THE INVENTION

The invention comprises a casting rod combined with an open face reel such that during a cast swing, a main portion of the rod moves in front of the reel to avoid colliding with casting line peeling off of the reel spool. The line is guided by a rod tip guide positioned at a tip portion of the rod. The combination is arranged such that nothing other than the mentioned guide contacts the line during the cast, thereby producing very little friction. During line retrieval, a retrieval guide positioned between the reel and the rod tip guide, guides the line onto the grooved rim of a roller as the rod bends under load. Several embodiments of the invention include various mechanisms for releasing the line during the cast swing.

An object of the invention is to provide a casting rod capable of long distance casting by eliminating most of the friction associated with conventional rods when casting.

Another object is to provide a casting rod capable of controlling the release of the casting line during a cast swing without the need for the operator to hold the line on his finger.

Another object is provide a casting rod capable of casting a variety of different types of line, including braided line, using an open face reel.

Another object is to provide a rescue tool for use in the event of a water sport accident.

Another object is to provide a tool for extending a rope out to a remote object and connecting the rope thereto.

Another object is to provide a tool which can aid in climbing sheer slopes.

Another object is to provide a tool for making fast long measurements.

Other objects and advantages of the invention will become apparent from consideration of the drawings and ensuing description.

BRIEF DESCRIPTION OF THE DRAWINGS

The accompanying drawings in combination with the description herewith, illustrate features and advantages of the invention. Like reference characters in different views refer to the same parts. The drawings are intended to illustrate principles of the invention and are not necessarily to scale and in which drawings:

FIG. 1 shows a partial side view of an embodiment of an antifriction casting rod including a line grip for holding and releasing a casting load;

FIG. 2 shows a front view of the mounted line grip of FIG. 1;

FIG. 3 shows a side view of a rod tip guide;

FIG. 4 shows a partial side view of an alternative embodiment of an antifriction casting rod wherein a partial sectional view of a posterior handle is taken vertically through the longitudinal axis of the handle, this embodiment includes a casting load release means operated by way of a cable within the rod;

FIG. 5 shows a rear sectional view, of a line retrieval guide, taken vertically through a pivotal axis of the guide;

FIG. 6 shows a partial side view of the line retrieval guide of FIG. 5;

DESCRIPTION OF A FIRST EMBODIMENT OF THE INVENTION

Figure 7:
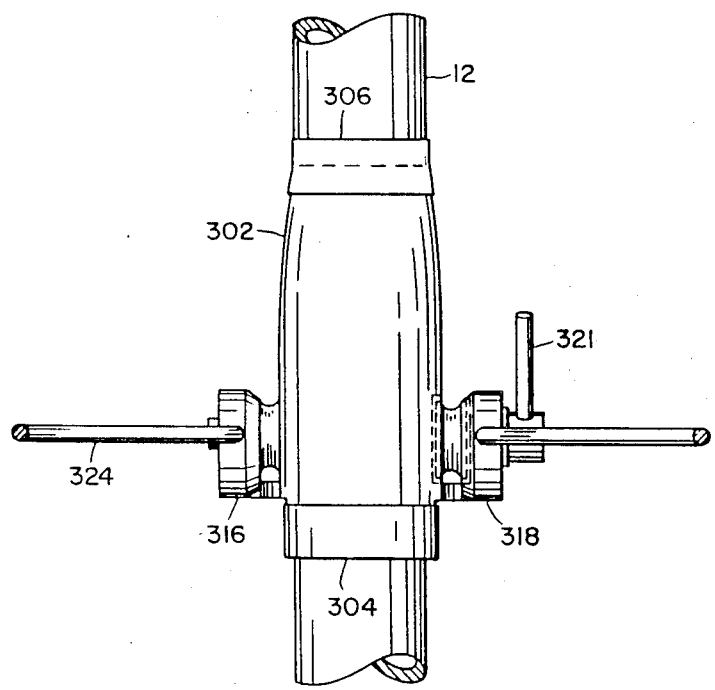
FIG. 7 shows a partial top view of the line retrieval guide of FIG. 5 wherein a section is taken along the line 7—7 of FIG. 5.

A first embodiment of an antifriction casting rod is identified generally by the numeral 1 in FIG. 1. The casting rod 1 comprises an elongated anterior handle 5 having a rear portion to which two bars 6, 8 are fixedly connected. Bars 6, 8 extend perpendicularly from the handle 5 and each has a lower end portion fixed to a saddle 10. The combination of the handle 5, bars 6, 8, and saddle 10 may be molded from plastic or graphite composite as a one piece unit.

The saddle is fixedly mounted on a rear portion of a tapered pole 12. Metal bands 14, 16, wrapped around the pole 12 and saddle 10, hold the combination together. Thus a bridge, comprising the bars, connects the rear portion of pole 12 to the rear portion of handle 5. The anterior handle longitudinal axis and the pole longitudinal axis point anteriorly in approximately the same direction.

The pole and anterior handle are spaced apart such that a conventional axial delivery casting reel 18 can be mounted for operation therebetween. Metal bands 20, 22 fix the reel to the handle 5.

The anterior handle is positioned at a small angle relative to the pole so that the reel spool is coaxially aligned with the aperture of a rod tip guide described hereinafter.

It is understood that for aesthetic reasons, or to save some space, the bridge could otherwise comprise a single bar having any preferred cross-sectional shape that will support the pole under stress. The bridge could also be curved in various ways for design purposes.

An elongated posterior handle 24 includes a front portion internally threaded to connect to an externally threaded portion of handle 5 (threads not shown) such that the anterior handle and posterior handle are approximately longitudinally aligned. Hence, the handle 24 is connected to the combination such that the posterior handle longitudinal axis points posteriorly in a substantially opposite direction relative to the anterior direction pointed by the other mentioned axes.

The handles 24, 5 bars 6, 8, and pole 12 have hollow interiors so that the casting rod 1 is relatively light in weight.

Alternatively, the posterior handle could be arranged to extend from the rear portion of the pole or from the bridge, but a preferred arrangement is as shown in the figures.

A butt 26 comprised of a resilient material, such as rubber, is fixedly attached to the handle 24 by conventional means.

Attached to the handle 5 is a line grip 28 (FIG. 1 and 2) positioned above and slightly forward of the reel spool. The line grip 28 includes a saddle-shaped base portion 30 fixed to the handle by means of a screw 31 passing through the handle and into the grip base (FIG. 2). Fixed to the base 30 is a curved finger rest 32 forming a concave surface. The concave surface is roughened or textured to provide slip resistance. The finger rest includes grooved or V-shaped end portions 33 (FIG. 2).

Casting line 34, from the reel 18, is received on the concave finger rest 32. The line is held on the grip surface with a finger of the operator's hand which holds anterior handle 5. The V-shaped end portions of the finger rest guide the line toward the center or midline of the line grip.

Mounted on a tip portion of pole 12 is a rod tip guide 36 (FIG. 3). Guide 36 includes a ring 38 held above the pole tip portion by a frame 39. The height of ring above the pole is calculated to prevent or minimize contact between the line spirals and the pole during a cast. Thus, the height should be at least as great as the largest diameter of the reel spool. The ring 38 has an inside diameter which can be as large as the mentioned reel spool diameter. Line 34 passes through the rod tip guide 36 as shown.

In order to guide line to be rewound, a line retrieval guide 300 (FIG. 5, 6, and 7) is attached to a mid portion of the pole 12. The guide 300 comprises an elongated center guide 302 being saddle-shaped to fit tightly around pole 12. In a longitudinal direction, the outer surface of center guide 302 is streamlined so that the front end of the same is contiguous with the surface of the pole. The guide 302 is fixed to the pole with bands 304, 306, each comprising a layer of thread wound around the guide and pole. Extending in opposite directions, from the center guide 302, are shafts 308, 310 which are received in respective opposed apertures within the guide wherein the shafts are welded thereto.

Rotatably supported on an inner portion of each shaft is a roller 312, 314. Pivotally supported on an outer portion of each shaft, adjacent a roller, is a loop support 316, 318. The inner portion of each shaft has a larger diameter than the outer portion of the shaft. Hence, each roller aperture has a greater diameter than that of a loop support aperture.

Support 318 is held on the shaft 310 by a cap 320 which is internally threaded to mate with a threaded end portion of the shaft. A handle 321, fixed to cap 320, provides a means for tightening the cap against support 318 which is sandwiched between the cap and the outer end of the inner portion of the shaft 310. The inner portion of the shaft 310 extends slightly beyond roller 314 so that the tightened cap holds support 318 fixed without interfering with the rotation of the roller.

Support 316 is held on shaft 308 by means of a snap ring 322 fitted in a groove around the shaft.

Guide 300 also comprises a closed wire loop 324 defining an elongated aperture 325. Each end of the loop 324 is press fitted into a bore in each respective loop support. The retrieval guide aperture 325 width dimension, which is perpendicular to the longest dimension of the aperture, is greater than the diameter of line spirals passing therethrough. Thus, during a cast, spiraling casting line peeling off of the reel spool passes through the loop without contacting the same.

In an operative position, the longest dimension of the aperture 325 is perpendicular to the pole. During the cast, the pole may flex up and down, wherein the spiraling line will oscillate within the aperture 325 along the longest dimension of the same. Hence, the retrieval guide avoids contacting or impeding the moving line spirals even as the pole flexes.

Each roller 312, 314, is fitted within and between recessed portions of an adjacent loop support and center guide so that line within the loop can slide onto a grooved rim of a roller if the pole bends under load during line retrieval.

The loop 324 and its supports 316, 318, are movable between the operative position and a retracted position (see FIG. 6). A projection 326, extending from each support 316, 318, rests on a respective tab 328 extending from each lateral side, respectively, of the center guide 302. This prevents movement of the loop beyond the operative position.

In the retracted position the longest dimension of the loop is nearly or approximately parallel with the pole. In that position a top portion of the loop 324 rests on the pole, thereby establishing a second limit to which the loop can pivot. The retracted position of the retrieval guide is used for saving space during storage of the rod.

The loop can be moved to either of the two positions by first loosening cap 320, by means of handle 321, and then moving the loop to the preferred position. The loop can then be fixed in that position by tightening the cap.

The combination of the center guide 302 and the loop 324 is arranged and shaped such that if the pole bends significantly when winding line, the line will be guided onto one of the rollers. Hence, winding can continue smoothly even when the rod 1 and reel are used for hauling in a heavy load.

The pole 12 may be comprised of two or more detachable sections for convenient storage or portage.

Operation of the First Embodiment

When casting, the rod 1 is held by the anterior handle 5 in one hand and by the posterior handle 24 in the other hand. A finger of the hand on handle 5 holds the line 34 on the line grip 28.

The cast swing is performed in a manner similar to that of a conventional spinning rod. The line and casting load (the object that is being cast) are released during the cast swing by lifting the finger off of the line grip 28 thereby releasing the line 34.

Grip 28 is provided to ease the line tension on the index finger of the operator and to improve control; especially when casting a heavy casting load. The grip 28 may, of course, be removed if all the casting loads are expected to be relatively light.

As will be shown in other embodiments of the invention, alternative load release means can be provided for casting heavy loads wherein the operator will not be required to hold the line on his finger.

The components of the casting rod 1 are arranged such that during the cast swing, the pole 12 moves in front of the casting reel 18. This prevents the pole and the retrieval guide from running into and interfering with the spiraling line peeling off of the reel.

The line peeling of the reel 18 does not contact any guides other than the rod tip guide. Thus, there is no interference with the spiraling line throughout the critical distance between the reel spool and guide 36. Hence, very little friction is produced. The resulting casts are exceptionally long compared with casts from conventional spinning rods when using heavier and stronger lines, including braided lines.

If the pole bends during rewinding, as when hauling a load, the line will slide onto a roller 312, 314, as described above.

Employed As A Tool For Rescue Operations

Figure 8:
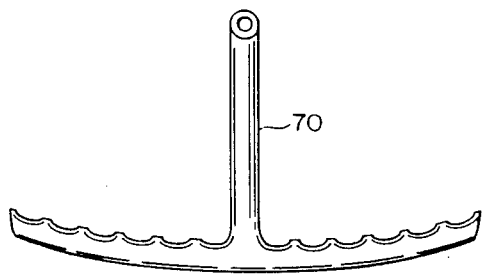
FIG. 8 shows a top view of a floatable plastic handlebar.

With its reliable ability to cast very high strength line over relatively long distances without backlash, the rod 1 can be a valuable rescue tool. For example, if the trunks of police cars contain the device, especially in towns having ponds or rivers and subfreezing temperatures, some seasonal fatalities can be prevented. When a person falls through thin ice, the first policeman on the scene would not have to waste valuable time for special equipment to arrive. He could have the rod 1 equipped with a floatable plastic handlebar 70, shown in FIG. 8, as the casting load. The handlebar 70 could first be cast beyond the victim wherein the policeman would then, if necessary, adjust his position such that the bar could be drawn toward the victim to haul him out. Using this method, the policeman or operator need not be so accurate as to be able to cast directly to the victim.

Equipped as mentioned above, the rod 1 can be kept as a rescue tool around swimming areas. The device can be used to haul in a swimmer in trouble, or to haul in a lifeguard or rescuer who is holding a victim. Other types of life-saving equipment could also be cast out with rod 1.

In a storm at sea, a boat operator could rescue a small craft in trouble by casting a grapple hook to the craft. In the same way, other floating objects could be recovered.

Employed As A Tool For Extending A Rope Out To A Remote Object And Connecting The Rope Thereto The casting rod 1 provides a tool which can be used in a method of connecting a rope to a remote object or location. The method is described in the following paragraphs.

Figure 9:
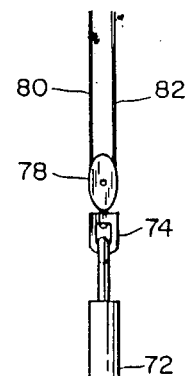
FIG. 9 shows an assembly comprising a grapple, swivel, pulley, and connected line.

Shown in FIG. 9 is a grappling hook or grapple 72 having a swivel portion 74 attached to a pulley 78. A casting line, having a first portion 80 and a second portion 82, is connected to the pulley 78. Both ends of the line can be attached to a spool of a casting reel, such as reel 18, mounted on the rod 1, wherein both line portions 80, 82 are then simultaneously wound onto the reel. The operator would cast the assembly (comprising the grapple 72, the swivel 74, and the pulley 78) and the line to the remote object. If the grapple misses the object, the line and grapple assembly are reeled in and the cast is repeated. When the grapple catches onto the object, the operator detaches the end of portion 80 from the reel and then attaches the end of portion 80 to an end of a rope. He can then reel in the second portion 82 and then the first portion 80, thereby drawing the rope toward and then through the pulley 78. He may continue reeling until a double length of the rope extends out to the grapple assembly at the remote object.

Alternatively, he could attach a one-way anchoring device (not shown) to the mentioned rope end so that when the same is drawn through the pulley 78, the rope cannot go backward through the pulley again. Thus, a single length of rope would be connected to the remote object.

Employed As A Tool For Climbing Sheer Slopes

The rod 1 can be used in climbing by using the method of attaching a rope to a remote object described above. A climber may cast above a sheer slope, especially a slope having no foot or hand holds to grab onto. Once the grapple 72 catches a limb or rock crevice, a rope can be attached to the grapple as explained above. As he ascends the rope, the climber can attach pitons or other holding devices along the way as backup security. Thus, if the grapple accidentally releases from its hold, the climber would fall only a short distance before being held by a piton.

Employed As A Tool For Making Fast Long Measurements

Since this invention can cast relatively heavy braided line without backlash, it is a valuable tool for making fast direct measurements. It could be used, for example, by land speculators, developers, and contractors in making land measurements quickly.

Figure 11:
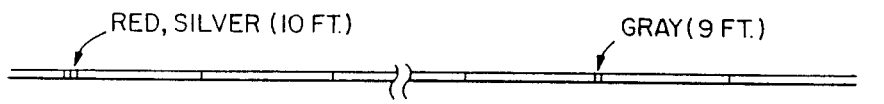
FIG. 11 shows portions of a color coded casting line.

As a measuring tool, the braided casting line is graduated with graduations marked with a color code (refer to FIG. 11). Graduations indicating feet are marked at intervals of one foot with one, two, or three colored abutting rings encircling the line. The abutting rings being positioned for interpretation in the sam manner as digits in a decimal number wherein the position of each ring, relative to the other rings in the graduation, indicates a multiple of a power of ten. Three rings, for example, indicate numbers in the hundreds; the exact number being determined by the colors.

The colored rings are translated into numerals as follows: red=1, orange=2, yellow=3, green=4, blue=5, purple=6, pink=7, brown=8, gray=9, and silver=0. In the top line of FIG. 11, therefore, a single gray ring is the nine foot mark, a red ring abutting a silver ring is the ten foot mark. In the bottom line of FIG. 11, red, yellow, and green abutting rings indicate the one hundred thirty four foot mark. The colors are read in the direction toward the distal end of the line.

A simple reminder of the color values could be placed on the rod handle for reference.

Inch graduations are indicated by a black ring at intervals of one inch between the foot markers.

Figure 10:
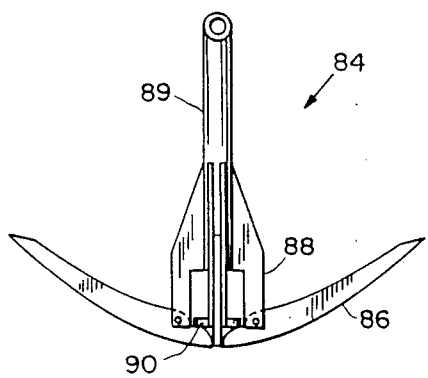
FIG. 10 shows a releasable grapple.

The graduated line can be attached to a releasable grapple 84 (FIG. 10) so that the same can be cast out to a desired location to catch and hold thereat. The grapple 84 includes hooks 86 which are pivotally mounted to brackets 88 welded to a central shaft 89. Inner end portions of the hooks are engaged with a piston 90 which is spring biased so that the hooks are urged to the hooking position shown in the figure. A hollow portion of shaft 89 houses the spring (not shown) which is of a compression type. The spring tension is such that when the grapple 84 is hooked to an object, a predetermined amount of pull on the line will cause the hooks 86 to pivot and release the grapple from the object. For example, the spring tension may be set so that a five pound pull on the line will cause the grapple 84 to release wherein the line and grapple may then be reeled in.

The advantage of using the grapple 84 is that it can be cast to a location which may be difficult to reach on foot. It can be cast, for example, across a stream, chasm, or marsh to catch on to the desired object from which the measurement will be taken. After reading the measurement, the line is pulled to release the grapple wherein the line and grapple are then reeled in.

Employed as a Fishing Rod

The exceptionally long distance casting capability of this invention using stronger lines can greatly enhance the sport of fishing. Heavy braided lines as well as monofilament can be utilized.

DESCRIPTION OF A SECOND EMBODIMENT OF THE INVENTION

Figure 12:
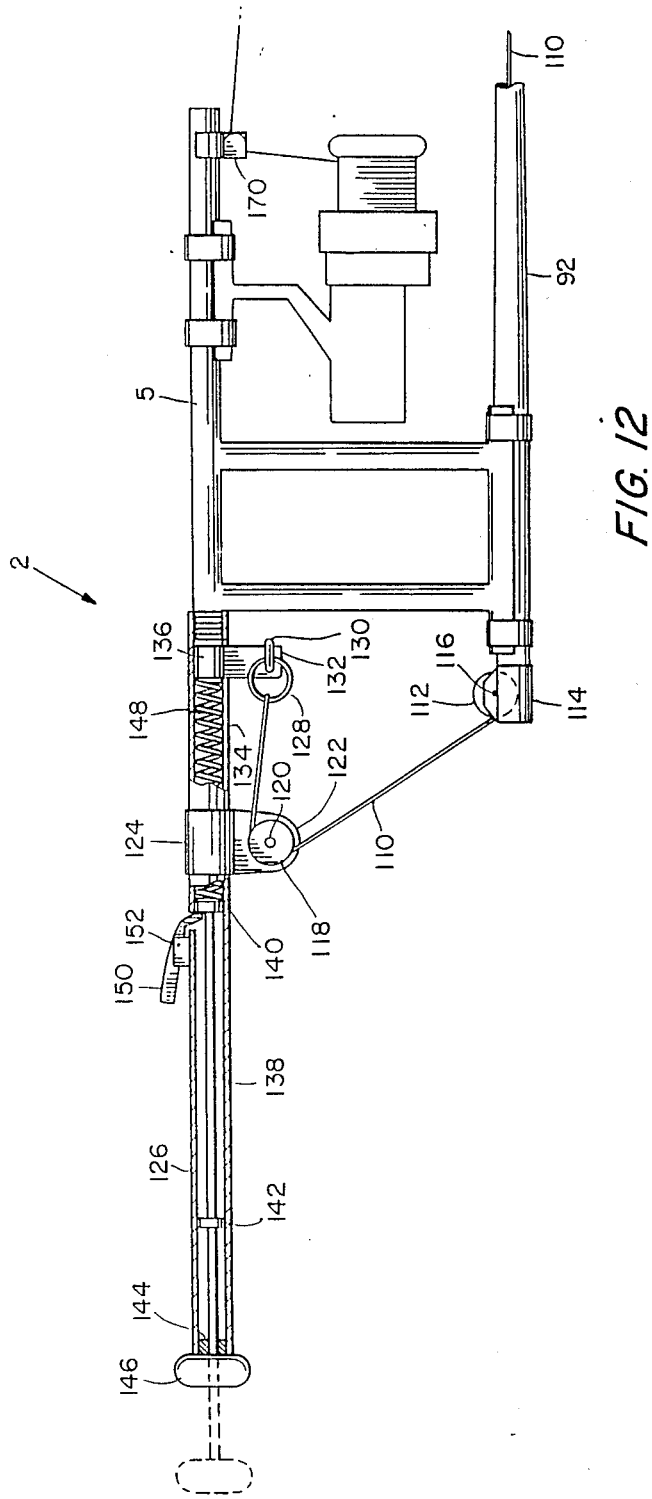
FIG. 12 shows a partial side view of another alternative embodiment of an antifriction casting rod wherein a sectional view of a posterior handle is taken vertically through the longitudinal axis of the handle, this embodiment includes a casting load release means operated by way of a cord within the rod.
Figure 13:
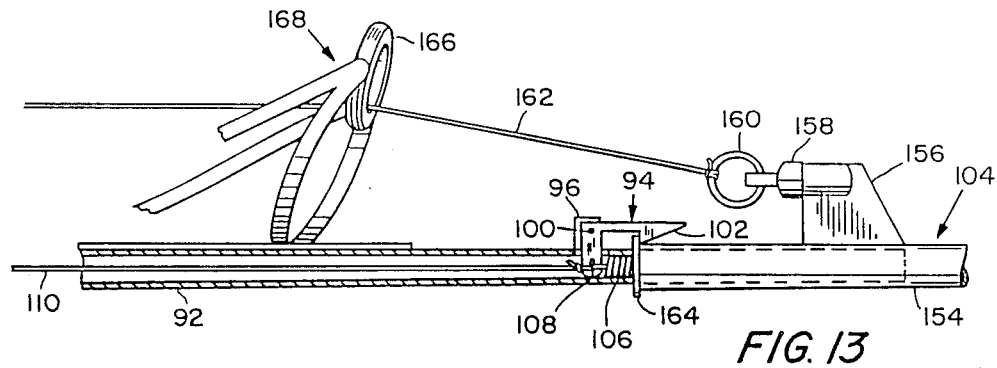
FIG. 13 shows a rod tip portion associated with the rod of FIG. 12 including details of the casting load release means.

Shown in FIG. 12 and 13 is a second embodiment of an antifriction casting rod 2 having most of the components of rod 1. The primary difference is that rod 2 includes a casting load release means which does not require that the operator hold the line with on his finger in order to cast. This can be advantages when casting heavy loads, such as for one or more of the specialized applications described above.

The release system of rod 2 includes a means for holding a casting load on the tip portion of the pole 92 and for releasing the load during a cast. The system comprises an L-shaped catch 94 (FIG. 13) pivotally mounted on a lug 96 which is fixed to the hollow pole 92. A pin 100, passing through the catch 94 and into the lug 96, provides pivotal support for the catch. A lower leg of the catch passes through a slot in pole 92 so that a lower end portion of the leg is housed inside the pole. An upper leg of the catch includes a triangular tooth 102 which catches and holds a casting load 104 onto the tip portion of the pole 92.

The catch 94 is movable between a locked position and an unlocked position. The tooth 102 holds the load when the catch is in the locked position and releases the load when the catch is in the unlocked position.

Within the hollow pole 92 is a tension spring 106 having an end portion received in a vertical slot 108 in the lower leg of catch 94, thereby attaching the spring to the catch. An opposite end portion of the spring 106 is attached to the tip end of the pole 92 so that the catch 94 is urged toward the unlocked position by the spring.

Also housed within pole 92 is a Dacron cord 110 having an end attached to the lower leg of catch 94.

Shown in FIG. 12 is a lower pulley 112 mounted to rotate within a slot in the rear portion of pole 92. The pulley 112 is mounted between a pair of lugs fixed to a sleeve 114 which encircles the rear portion of the pole. A pin 116, passing through the lugs and through the pulley, supports the pulley for rotation thereon. Thus, a lower portion of the pulley 112 is housed within the hollow pole 92 wherein the cord 110 is mounted in the grooved rim of the pulley.

The cord 110 is also mounted in the grooved rim of an upper pulley 118. The upper pulley is rotatably supported on a bearing 120 which passes through the pulley and is fixed to a lug 122. The lug 122 is fixed to a sleeve 124 encircling the hollow handle 126.

An end portion of the cord 110 is tied to a ring 128 which is held on a hook 130 fixed to a tab 132. The tab 132 is received in an elongated slot 134 extending longitudinally through the underside of handle 126. An upper end of the tab 132 is fixed to a piston 136 which is housed within the posterior handle wherein the piston is longitudinally slidable therein. When the piston 136 slides within handle 126, the tab 132 slides within the elongated slot 134 thereby moving the cord 110. Hence, the cord moves over the pulleys 118, 112 and longitudinally through the hollow pole 92 to operate the catch 94.

Within the handle 126 is a shaft 138 having an inner end fixedly attached to an annular holding flange 140. Also fixed to shaft 138 is an annular stop flange 142. Flanges 140 and 142 are longitudinally slidable within the handle. A portion of the shaft 138 is slidably supported in a bushing 144 which is fixed in an outer end of the handle 126. The outer end of the shaft 138 is fixed to a rubber butt 146. Thus, the butt 146, shaft 138, and flanges 140, 142, form a plunger which is longitudinally slidable within handle 126. The plunger is movable between a release position, indicated by the dashed outline (FIG. 12), and a hold position shown by the solid line representation. When stop flange 142 contacts bushing 144, the plunger is prevented from exceeding the release position.

Housed within handle 126, between the flange 140 and the piston 136, is a compression spring 148 which is longitudinally slidable within the handle. The size of compression spring 148 and its ability to store energy is substantially greater than that of tension spring 106. Thus, when the butt 146 is pushed toward the hold position, spring 148 is compressed while compelling piston 136 to move toward handle 5. The resulting pull on cord 110 forces catch 94 to the locked position.

Mounted on the handle 126 is a load release switch 150 pivotally supported on a U-shaped bracket 152 which is fixed to the handle. The switch 150 is pivotally held between the legs of the U by a pin passing through the bracket legs and the switch. The switch 150 includes an end portion which is bent at an oblique angle relative to its main body. The switch is spring loaded and positioned such that its end portion is urged to pass through an aperture through the handle 126 as shown in FIG. 12 (the switch spring is not shown). As the plunger is pushed, by means of the rod butt 146 to the hold position, the flange 140 first lifts the angled end portion of switch 150 upwardly. As the flange 140 passes the switch 150, the switch end portion passes through the handle aperture to lock the plunger and catch 94 in their respective hold and locked positions. In that condition, the switch end portion blocks the flange 140 from returning under pressure from spring 148 which is compressed by the plunger. Hence, catch 94 is held in the locked position. However, when the main body of the switch 150 is pressed by the thumb of an operator, the switch end portion pivots out of the way of the plunger. Consequently, springs 148 and 106 are released thereby moving the plunger and catch 94 to their respective release and unlocked positions to release the casting load 104.

The pole 92 may be comprised of a plurality of separate sections which are connectable with each other. Thus, the rod can be disassembled for compact storage or portage as are conventional casting rods. Before disassembly, the ring 128 can be unhooked from hook 130 and cord 110 can be dismounted from pulley 118. The resulting slack in cord 110 will allow the individual sections of pole 92 to be pulled apart for disassembly. The process is reversed when the rod is to be reassembled.

The casting load 104 (FIG. 13) comprises a hollow shaft 154 which slides over the tip portion of the pole 92. A lug 156, welded to shaft 154, includes a swivel 158 having a ring 160 to which a casting line 162 is attached. An inner end of the shaft 154 includes an annular flange or lip 164 which is clutched by tooth 102 of catch 94. The outer end portion of shaft 154 is connected to the working portion of the casting load used for a specific application of the casting rod.

The line 162 passes through the ring 166 of a guide 168 mounted on pole 92. Guide 168 functions similar to rod tip guide 36 of rod 1. However, the axis of ring 166 is offset from the vertical plane which includes the reel spool axis and the axis of pole 92. This offset position is accomplished by mounting the guide 168 at a lateral angle relative to the mentioned plane, so that th pole 92 will not impede the line 162 during line retrieval.

Operation of the Second Embodiment

Pushing the plunger to the hold position and locking the casting load on the pole can be accomplished by a single motion of the operator. With the butt 146 positioned on the ground, the casting load 104 can simply be pushed down over the tip portion of the pole 92. The longitudinal force will cause the plunger to move to the hold position wherein the catch 94 will lock onto the casting load.

The casting load may also be mounted on the pole when the plunger is already in the hold position. In this case, as the shaft 154 slides over the tip portion of the pole, the lip 164 lifts the angled tooth 102 of the spring loaded catch. Then, as the lip passes the point of the tooth, the catch snaps down and clutches the lip.

It is not necessary for the operator to control the line with his index finger as is conventional when casting. Line release is controlled by switch 150. If preferred, a line holder 170 may be used to hold the line when the reel bail is opened in preparation for a cast. During the cast swing, when switch 150 is pressed to release the casting load 104, the line is automatically pulled out of the holder 170.

There is at least one line holder (Pat. No. 3,654,722) that is commercially available. The device yieldingly holds the line by means of a small spring loaded ball wherein the amount of spring load can be adjusted so that the line will release under a preferred amount of tension. Its intended function is to release the line when a fish strikes so that the fish can run with the bait until the fisherman sets the hook. However, the device can also provide the new function described above.

DESCRIPTION OF A THIRD EMBODIMENT OF THE INVENTION

Figure 14:
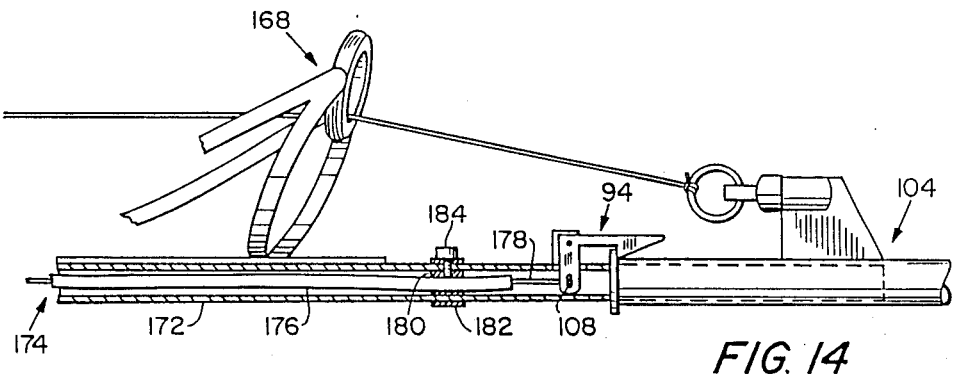
FIG. 14 shows a rod tip portion associated with the rod of FIG. 4 including details of the casting load release means.

Shown in FIG. 4 and 14 is a third embodiment of the antifriction casting rod referred to generally by the numeral 3. The rod 3 includes a casting load release means wherein operation of the catch of rod 3 is achieved by means of a remote cable.

Contained within the hollow pole 172 is a flexible remote cable or catch cable 174. The cable includes a housing 176 containing a wire 178 which can move longitudinally within its housing. An outer end portion of the wire 178 is bent into an L shape. The short leg of the wire L is received in the vertical slot 108 cut into the lower leg of the catch 94. Thus, back and forth longitudinal movement of the wire 178 can move the catch 94 between the locked and unlocked positions. A plastic sleeve 180 around an outer end portion of the cable housing 176 maintains the same in a concentric position within the pole 172. A metal collar 182 encircles the pole 172 wherein a screw 184, passing through a threaded aperture through the collar and through the pole, holds the cable housing fixed therein.

A rear portion of the cable 174 passes out of the rear portion of pole 172 and then passes into a slot cut into the hollow posterior handle 186. A clip 188 holds the end of the cable housing fixed within the handle 186.

Connected to the holding flange 140 is an inner end of the cable wire 178 so that by moving the plunger back and forth, the catch 94 is moved between the locked and unlocked positions.

Compressed between the holding flange 140 and the rear portion of handle 5 is a compression spring 192. The spring 192 urges the plunger toward a release position and the catch 94 to its unlocked position, thereby releasing the casting load. The dotted outline shows the plunger in the release position. When the butt 146 is pushed toward the handle 186, the spring 192 is compressed between the flange 140 and the anterior handle 5.

During a cast swing, the operator can release the casting load 104 by pressing on switch 150 in the same manner as with rod 2.

DESCRIPTION OF A FOURTH EMBODIMENT OF THE INVENTION

Figure 15:
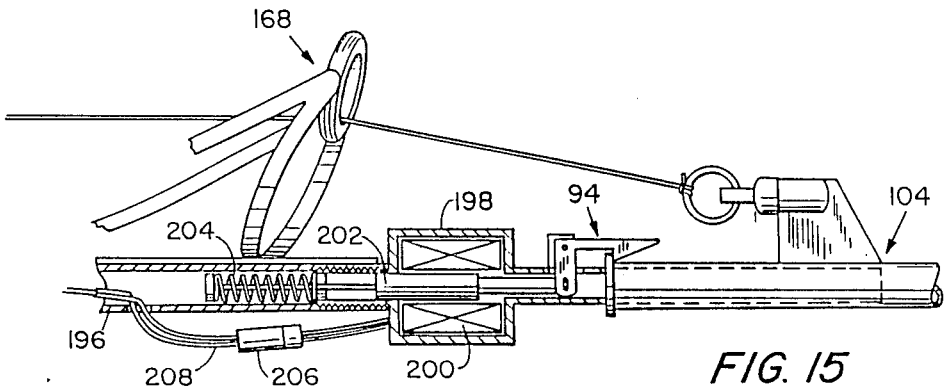
FIG. 15 shows a rod tip portion associated with a rod of FIG. 17 including details of a casting load release means.

Shown in FIG. 15, 16, 17 is a fourth embodiment of the antifriction casting rod identified generally by the numeral 4. The rod 4 includes a casting load release means wherein the catch 94 of rod 4 is operated by means of a solenoid.

A hollow tip portion of the pole 196 is internally threaded to receive an externally threaded portion of a housing 198 for a solenoid coil 200. Within the coil 200 is a solenoid armature 202 which is connected to the catch 94. Back and forth longitudinal movement of the armature moves the catch between the locked and unlocked positions. When the coil is energized, the catch is moved to the unlocked position. A spring 204, connected to the armature 202, urges the catch 94 to the locked position.

The coil 200 is electrically connected, by means of a connector 206, to a pair of insulated wires 208 housed within the hollow pole 196. The wires extend to a hollow posterior handle 210 which houses batteries in a manner similar to that of rods having electric powered reels.

Figure 16:
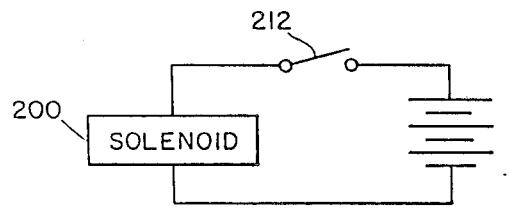
FIG. 16 shows how the electrical components of the rod of FIG. 15 and 17 are connected.

A conventional momentary switch 212 is mounted on the handle at a convenient location for operation by a thumb of the operator. The electrical components are connected in series as shown in FIG. 16.

Figure 17:
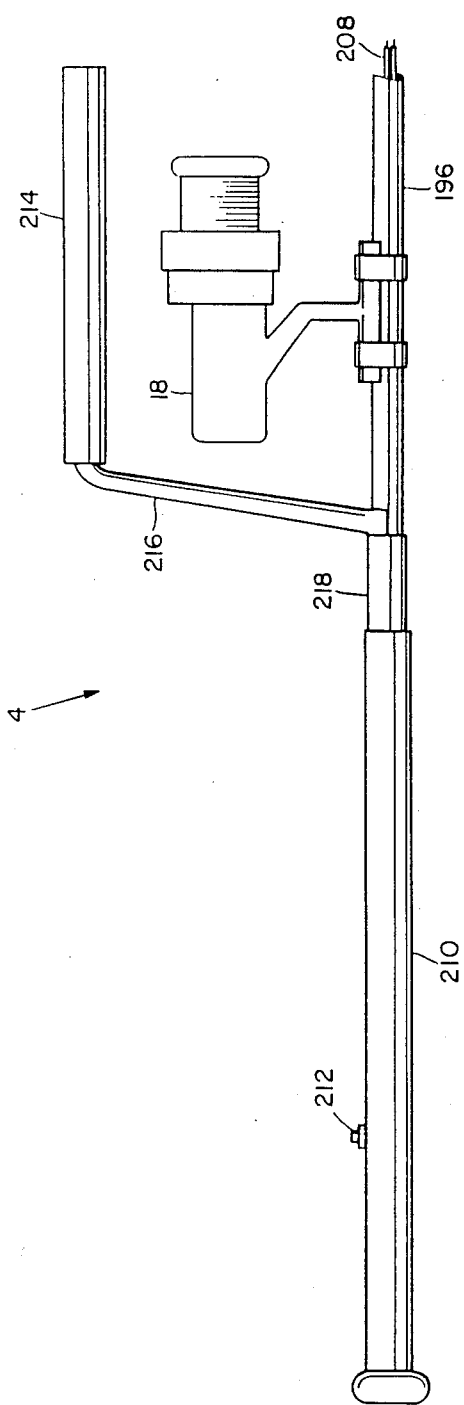
FIG. 17 shows a partial side view of another alternative embodiment of an antifriction casting rod including a casting load release means operated by way of electrical wires within the rod.

Shown in FIG. 17 is an alternative way of arranging the reel 18 and the rod handles. Reel 18 is mounted directly to the pole 196. The anterior handle 214 is supported by an aluminum bracket 216 which is fixed to the pole by a band 218. Posterior handle 210 is coaxially fixed to the pole 196.

It can be understood that anterior handle 214 could alternatively be supported by a bracket connecting the former with the reel housing rather than with the pole.

DESCRIPTION OF AN ALTERNATIVE ROD TIP GUIDE

Figure 18:
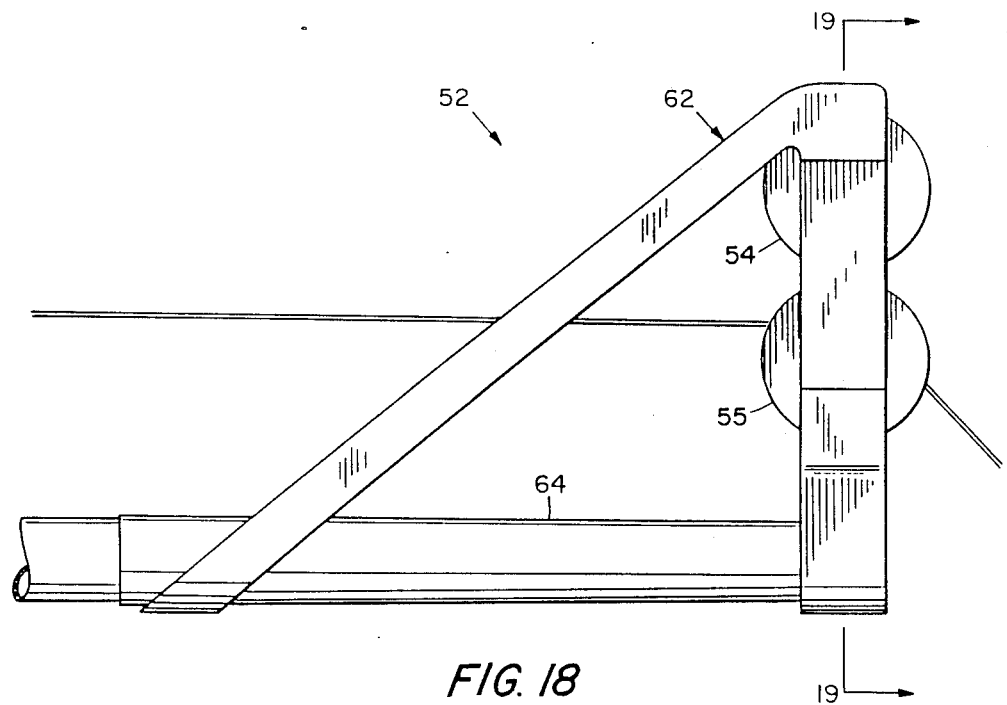
FIG. 18 shows a side view of an antifriction rod tip guide.
Figure 19:
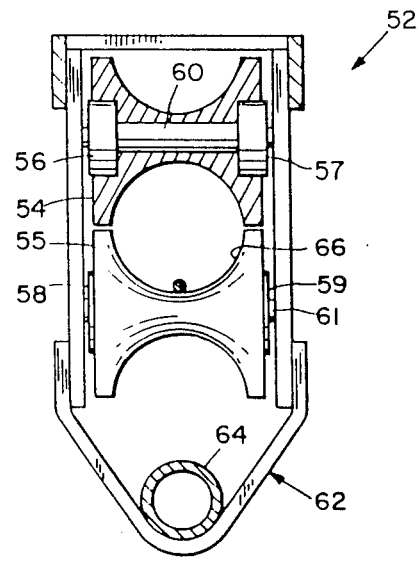
FIG. 19 shows a sectional view of the guide of FIG. 18 taken along the line 19—19.

Shown in FIG. 18 and 19 is an alternative rod tip guide 52 which could be substituted for guide 36 or for guide 168. The antifriction guide 52 comprises a pair of antifriction rollers 54, 55, rotatably mounted, one above the other. The upper roller 54 is mounted to rotate on antifriction bearings such as ball bearings 56, 57, which are supported on a shaft 60. The lower roller is mounted to rotate on similar antifriction or ball bearings 58, 59, which are supported on a shaft 61. Shafts 60, 61 each have end portions press fitted into apertures in a supporting framework 62. A lower portion of the framework 62 is welded to a ferrule 64 which is cemented onto the tip portion of the pole.

The grooved rims of the rollers 54, 55, together, define an annular aperture 66 through which the casting line is guided, thereby providing an antifriction guide for the line. The rim portions of the rollers are positioned adjacent, and sufficiently close, to each other so that the line cannot jump out of aperture 66.

The alternative tip guide 52 could be used for casting extremely heavy or high friction types of line.

While the above description contains many specificities, these should not be construed as limitations on the scope of the invention, but rather as exemplifications of preferred embodiments thereof. Those skilled in the art will envision other possible variations that are within its scope. Accordingly, the scope of the invention should be determined not by the embodiments illustrated, but by the appended claims and their legal equivalents.

What is claimed is:

1. A casting rod comprising:
   an elongated anterior handle having a rear portion;
   a pole having a rear portion and a tip portion;
   a rod tip guide connected to the tip portion of the pole;
   a bridge connecting the pole rear portion with the rear portion of the anterior handle such that the anterior handle longitudinal axis and the pole longitudinal axis point anteriorly in approximately the same direction wherein the pole and anterior handle are spaced apart such that a casting reel can be mounted for operation therebetween, the reel being of the type that casts line in a direction approximately parallel to a spool axis; and
   an elongated posterior handle having a front portion, the posterior handle front portion being connected to the combination such that the posterior handle longitudinal axis points posteriorly in a substantially opposite direction relative to the anterior direction pointed by the other mentioned axes.

2. The casting rod as defined in claim 1, wherein the anterior handle and the posterior handle are approximately longitudinally aligned.

3. The casting rod as defined in claim 1, wherein the rod tip guide comprises:
   a framework mounted to the pole; and
   a plurality of antifriction rollers rotatably mounted to the framework such that each roller rotates on at least one antifriction bearing, each roller having a rim portion positioned relative to an adjacent roller rim portion such that the rim portions of all the rollers together define an aperture through which casting line is guided during operation of the casting rod thereby providing an antifriction guide for the line.

4. The casting rod as defined in claim 1, further comprising a line retrieval guide attached to the pole, the retrieval guide including a closed loop defining an elongated aperture through which spiraling casting line passes on route to the rod tip guide during a line cast, the retrieval guide being positioned on the pole such that the longest dimension of the aperture is normally substantially perpendicular to the pole so that the spiraling line can oscillate within the aperture along the longest dimension of the same as the pole flexes during the cast thereby preventing the retrieval guide from impeding the moving spirals.

5. The casting rod as defined in claim 4, wherein the retrieval guide aperture width dimension, which is perpendicular to the longest dimension of the aperture, is greater than the diameter of the line spirals passing therethrough.

6. The line retrieval guide as defined in claim 4, wherein the loop portion is pivotally supported such that the same is movable between an operative position and retracted position, the loop portion in the retracted position having its longest dimension approximately parallel with the pole for saving space during storage.

7. The casting rod as defined in claim 1, further comprising a line retrieval guide attached to the pole, the retrieval guide including a closed loop defining an aperture through which spiraling casting line passes on route to the rod tip guide during a line cast, the aperture have a diameter greater than that of the line spirals passing therethrough, the retrieval guide having at least on roller having a grooved rim portion for receiving line thereon, the roller being rotatably supported proximate to the loop circuit such that the line passing through the line retrieval guide can be guided onto the grooved rim of the roller during line retrieval.

8. The casting rod as defined in claim 7, wherein there are two rollers positioned such that the pole is between the rollers.

9. The casting rod as defined in claim 1, further comprising means for releasing a casting load while swinging the rod for a cast, the load releasing means comprising a line grip positioned above and adjacent the reel spool, the line grip including a surface for receiving casting line in order to hold the same between the surface and a finger of the operator's hand which holds the anterior handle, the line grip also including at least one portion having a groove for guiding the casting line onto a preferred location on the surface.

10. A casting rod as defined in claim 1, further comprising:
a catch movably mounted on the pole tip portion for detachably holding a casting load, the catch being movable between a locked position which holds the casting load and an unlocked position which releases the casting load; and
means for remotely controlling the catch from the proximity of the handles so that the casting load can be released during a cast swing.

11. The casting rod as defined in claim 10, wherein the means for remotely controlling the catch comprises:
a catch release cable housed within the pole, the cable including a wire attached to the catch such that moving the wire back and forth longitudinally also moves the catch alternately between the locked position and unlocked position;
a spring connected to the wire for urging the catch into the unlocked position;
means for holding the spring under tension thereby holding the catch in the locked position; and
means for releasing the spring thereby releasing the casting load while swinging the rod for a cast.

12. The casting rod as defined in claim 10, wherein the means for remotely controlling the catch comprises:
resilient means for urging the catch into the unlocked position;
a cord housed within the pole, the cord being attached to the catch such that a pulling force on the cord, exceeding the force of the resilient means, urges the catch into the locked position;
a spring connected to the cord such that the catch is held in the locked position when the spring is tensioned;
means for holding the spring under tension thereby holding the catch in the locked position; and
means for releasing the spring thereby releasing the casting load while swinging the rod for a cast.

13. The casting rod as defined in claim 10, wherein the means for remotely controlling the catch comprises:
resilient means for urging the catch into the locked position;
a solenoid coil attached to the pole;
a solenoid armature movably supported within the coil, the armature being connected to the catch such that back and forth longitudinal movement of the armature moves the catch between the locked position and the unlocked position wherein energizing the coil results in moving the catch to the unlocked position; and
means for energizing the coil during a cast swing to release the casting load.

14. The casting rod as defined in claim 1, further comprising casting tool for measuring comprising:
a graduated casting line wound on the reel wherein the graduations are color coded such that they can be readily translated into numbers for measuring.

15. The casting tool for measuring as defined in claim 14, wherein the casting reel is of the type that casts line in a direction substantially parallel to a spool axis.

16. The casting tool for measuring as defined in claim 14, wherein a color coded graduation comprises a group of colored rings encircling the line, the rings being positioned for interpretation in the same manner as digits in a decimal number wherein the position of each ring relative to the other rings in the graduation indicates a multiple of a power of ten so that the graduation can be readily translated into a decimal number.

17. The casting tool for measuring as defined in claim 14, further comprising a releasable grapple attached to a distal end portion of the casting line, the grapple comprising:
a central body;
a plurality of hooks pivotally supported on the central body, the hooks being movable between a hooking position for catching onto an object and a releasing position for releasing the grapple from the object; and
means for urging the hooks to the hooking position such that when the grapple is caught on an object a predetermined amount of tension on the line will cause the hooks to pivot toward the releasing position thereby releasing the grapple from the object.

18. A method of extending a rope from a casting location to a remote object and connecting the rope thereto comprising:
attaching a pulley to a grapple;
connecting a casting line, having a first portion and a second portion, to the pulley;
attaching the two ends of the casting line to a casting reel and simultaneously winding the line first portion and the line second portion thereon;
casting the grapple with the attached pulley and line to the remote object to catch thereon;
detaching the end of the line first portion from the reel and attaching the first portion end to an end of a rope; and
reeling in the line second portion and then reeling the first portion thereby drawing the rope through the pulley so that the rope extends from the casting location to the remote object.

19. The method as defined in claim 18, wherein casting is carried out by releasing the grapple during a cast swing of a casting rod by operating a catch mounted on a tip portion of the rod wherein the catch holds the grapple, the catch being remotely operated from the proximity of a handle portion of the rod.

20. The method as defined in claim 19, wherein operating the catch is carried out by means of a release switch mounted proximate to the rod handle, the switch being connected with the catch by a cord.

* * * * *